350-377 SR
XR 3,500,354 7 X 4030W
SEARCH ROOM
CROSS REFERENCE

CONTENT-ADDRESSED MEMORY USING OPTICAL INTERROGATION

Filed Jan. 25, 1967 2 Sheets-Sheet 1

INVENTORS
DONALD O. SMITH
KENNETH J. HARTE
BY
Edward D. Thomas
AGENT

3500354
OR IN 365/234

CONTENT-ADDRESSED MEMORY USING OPTICAL INTERROGATION

Filed Jan. 25, 1967 2 Sheets-Sheet 2

INVENTORS
DONALD O. SMITH
KENNETH J. HARTE
BY
Edward D. Thomas
AGENT

United States Patent Office 3,500,354
Patented Mar. 10, 1970

3,500,354
CONTENT-ADDRESSED MEMORY USING OPTICAL INTERROGATION

Donald O. Smith, Lexington, and Kenneth J. Harte, Carlisle, Mass., assignors to Massachusetts Institute of Technology, Cambridge, Mass., a corporation of Massachusetts Filed Jan. 25, 1967, Ser. No. 611,754
Int. Cl. G11c *15/00, 7/00;* G02f *1/22*
U.S. Cl. 340—174 5 Claims

ABSTRACT OF THE DISCLOSURE

A content-addressed memory system, having a thin film magnetic memory storage array employing conventional electronic information storage methods, uses magneto- or electro-optical cells to present the interrogation word to the memory array in the form of plane-polarized interrogating light beams. The information is retrieved with nondestructive read-out by means of the longitudinal magneto-optical effect.

Catalog Memory, Associative Memory, Content-Addressed Memory, and Data Addressed Memory are among the names used to describe a collection or assemblage of elements having data storage capabilities and which are accessed simultaneously and in parallel on the basis of data content rather than by specific address or location. Generally the memories are "word organized" for reading and writing operations to assist in performing the functions of data association. In some cases, a fixed portion of the word is set aside for interrogation and all of that portion must be used for an interrogation. A variation of this organization divides the word into fixed segments, any of which can be used as the interrogated portion, but all of the bits in the interrogated segment must be used. A fully flexible memory allows any choice of bits in the word to be used in the interrogation and the remainder of the word to be read. It is common practice to divide the word into "tag" and "data" portions in order that those words meeting the search criteria may be marked for subsequent operations.

Applications suggested for content-addressable systems are numerous and include all aspects of file maintenance, pattern recognition, mathematical system solution, information storage and retrieval, translation, communication and transportation operations, as well as miscellaneous and special purpose types.

The advantages of content-addressable memory organizations are simplified data storage and retrieval with increased speeds and simplified programming, particularly in such common data manipulations as sorting, collating, searching, matching, cross referencing, updating and list processing.

It is noted that U.S. Patent No. 3,031,650 issued Apr. 24, 1962, to R. J. Koerner for "Memory Array Searching System," and U.S. Patent No. 3,121,217 issued Feb. 11, 1964, to R. S. Seeber, Jr., et al. for "Memory and Circuits Therefor," are related to content-addressable memories. Attention is also directed to the paper by A. G. Hanlon, "Content-Addressable and Associative Memory Systems, a Survey," IEEE Transactions on Electronic Computers, Vol. EC–15, No. 4, August 1966, which includes an extensive bibliography of about 125 references.

In general, the sensing or read-out of information stored in magnetic memory arrays is accomplished by detecting induction voltages which appear as a result of some motion of the magnetic field representing the stored information. The high speed of operation often produces a signal-to-noise problem by introducing transient voltage into the sensing circuit from various selection circuits. Consequently, a method of sensing magnetic data storage is desirable which can be decoupled from the noise generated by the energy required to switch the memory array. In principle, magneto-optical sensing has the capacity to solve the decoupling problem as a direct result of the wide frequency difference between switching currents and an optical light source. In the past, the sensitivity of optical systems has been found to be so poor as to make any broad application impractical. Some improvement of the magneto-optical effect has been reported in the literature by the use of a dielectric film on top of the magnetic surface. Reference may be made to "Kerr Magneto-Optical Effect, I, II," by P. H. Lissberger, J. Opt. Soc. Am., 51, 948 (1961) and "Modification of the Longitudinal Kerr Magneto-Optical Effect by Dielectric Layers," by the same author, J. Opt. Soc. Am., 54, 804 (1964).

In patent application, Ser. No. 348,453, filed Mar. 2, 1964, now Patent No. 3,393,957, D. O. Smith described methods for enhancing the longitudinal and polar magneto-optical effects which make use of very thin magnetic films positioned in an optical standing wave and coupled to free space by means of a multilayer dielectric film optical system. In patent application, Ser. No. 448,961, filed Apr. 19, 1965, now Patent No. 3,451,740, D. O. Smith described certain improved structures for increasing the basic conversion efficiency and hence the sensitivity of magneto-optical mode conversion.

The present application is directed to the application of magneto-optical or electro-optical effects to the interrogation operation of a content-addressable memory system. The information storage cells are planar magnetic films organized as in conventional "word organized" memory systems and conventional electrical operations are used for the purpose of storing and changing the information content of the memory. Each column of digit cells of the word organized array is illuminated by plane polarized light passing through an electro-optical Kerr cell associated with that digit column which imposes a $\pm\alpha$ rotation of polarization in accordance with the sense of the digit of the interrogation word. Reflection from the storage bit in the memory array adds a rotation of $\pm\alpha$ depending upon the stored information. For a word which is the negative of the pattern of the $\alpha$'s placed on the illumination, there will be no light passing through the analyzer to the word detector; all other words will have light from at least one bit reaching their respective word detectors. Alternatively, the $\pm\alpha$ rotation of polarization can be imposed on the digit by a thin film of magnetic material having its direction of remanent magnetization in accord with the sense of the digit bit of the interrogation word.

The logical requirement for content-addressing is that $$NI_m < I_M \quad (1)$$

where N is the number of bits in a word, and $I_m$ and $I_M$ the light intensity at the detector from a matched or mismatched bit, respectively. This condition imposes certain requirements on parameters such as the skew of the magnetization in the storage cells, the optical rotation, and the amount of allowable uncrossing of the polarizer and analyzer. Thus, for storage cells with easy axes skewed by an angle $\phi$ $$I_{m,M} \propto \sin^2 [\alpha(1 \mp \cos\phi)] \quad (2)$$

where the signs $\mp$ are associated with the subscripts $m$ and M, respectively. Then from Equations 1 and 2 to lowest order in $\alpha$ $$\cos\phi \gg \frac{\sqrt{N}-1}{\sqrt{N}+1} \quad (3)$$

so that with $N=100$, $\phi\leq 35°$. Since skew is easily controlled to within a few degrees, it is unlikely that skew would ever be a problem in magneto-optically sensing any magnetic film memory.

For the polarizer and analyzer uncrossed by an angle $\epsilon$, and with $\epsilon<\alpha$, Equation 1 gives to lowest order $$\alpha>\frac{\epsilon\sqrt{N}}{2} \quad (4)$$

so that with $N=100$ and $\epsilon=1°$, $\alpha>5°$. For thin films of magnetic metals not coated with auxiliary dielectric films, $\alpha$ is only of the order of 0.1°. However, by using dielectric coatings, a very thin magnetic film, and a mirror substrate, the magneto-optical optical rotation $\alpha$ for reflection can be made as large as desired.

However, the logical condition of Equation 4 is probably not the most important practical requirement on the magneto-optical behavior, but rather signal detection will require high efficiency of energy conversion between the incident and exit modes of polarization.

These and other features of the invention will be better understood from the detailed description and the accompanying drawing in which.

Figures 1, 2:
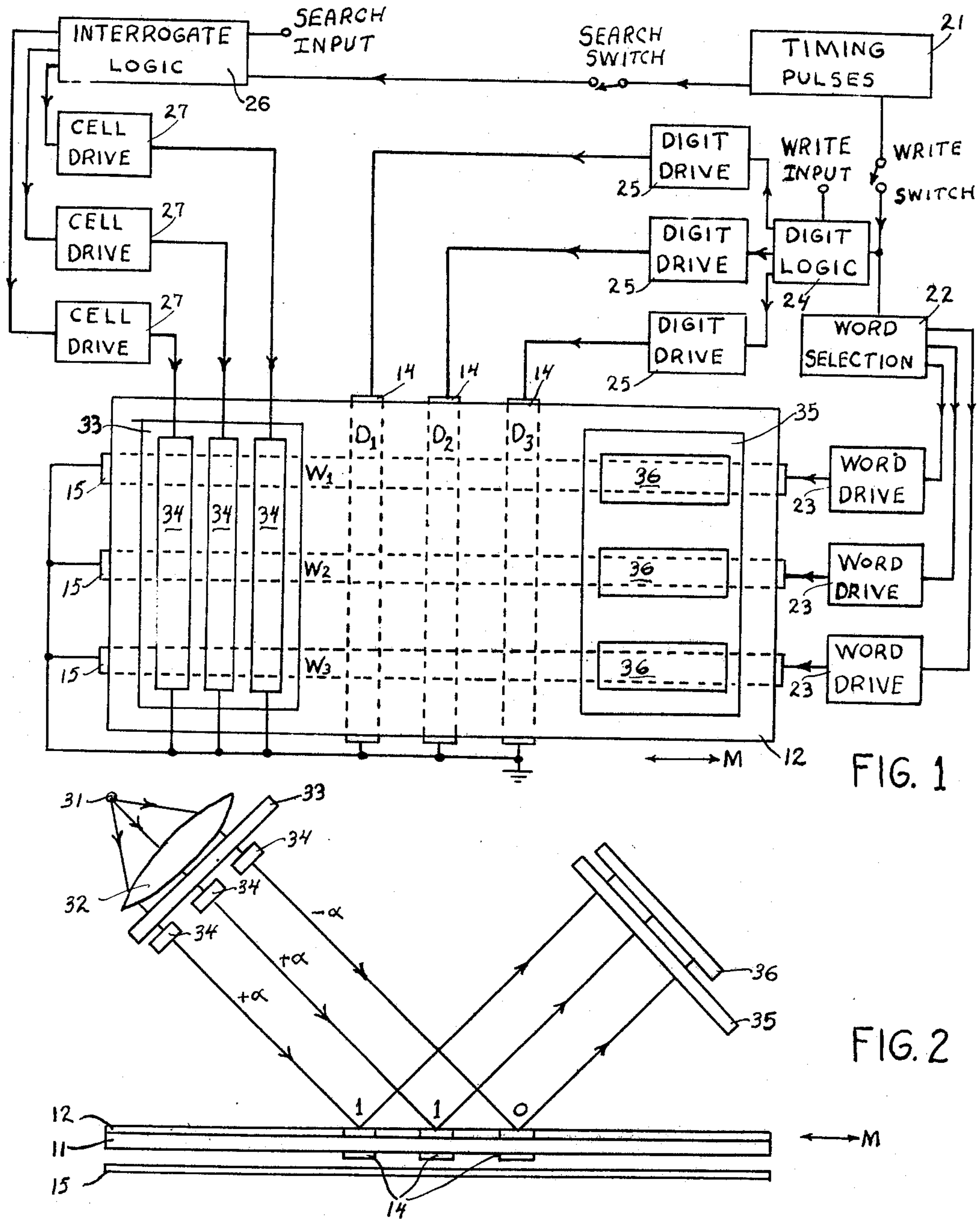
FIGURE 1 shows content-addressed memory array using thin film information storage cells and optical readout.
FIGURE 2 shows the optical arrangement of FIG. 1.

FIGURES 1 and 2 show a thin film memory array, having in the interest of simplicity only a three-bit word memory with a capacity of three words. A substrate 11 has a thin film 12 of magnetic material deposited on its upper surface. It is assumed that film 12 has been deposited under conditions such that it has an easy axis in the direction shown by arrow M. The stored bits of a word are provided in the localized regions of film 12 which occur at the intersections of the word excitation lines 15 and the orthogonal digit excitation lines 14, such as $W_2D_1$, $W_2D_2$ and $W_2D_3$.

Writing of information is accomplished using the standard method of time coincidence of a transverse field from current in a word line driver 23 selected by word selection circuit 22 and a digit field furnished by digit line drive current whose direction of flow is selected by digit logic circuit 24 and applied through digit line drivers 25. The result of coincidence of digit and transverse fields is to magnetize the region at their intersections either to the right or to the left, in accordance with the sense of the stored word bits.

The optical arrangement is more readily understood from FIGURE 2. Light from source 31 is formed into a collimated beam by lens 32 and polarized into a plane polarized beam by polarizer 33, which may be a dichroic sheet with its transmission plane at right angles to the plane of incidence. Each digit column is supplied by a Kerr electro-optical cell 34 to effect a rotation $\pm\alpha$ in the plane of polarization. The light reflected from magnetic film 12 is passed through analyzer 35, which is arranged with its transmission plane substantially at right angles to the plane of transmission of polarizer 33. Each word row is provided with its own detector 36, which may take the form of a conventional photomultiplier tube.

To interrogate the memory, all bits of the array are illuminated simultaneously. The characteristic bits of the search word are imposed by energizing the digit column Kerr cells 34 to effect a rotation of the light beam illuminating each digit column. The operation of interrogation logic circuit 26 is to energize Kerr cell drivers 27, which in turn impose voltages of the proper polarity to effect + and − $\alpha$ rotations of the digit beam polarization in accordance with the sense of the bits of the search word. For example, the word 1–1–0 is illustrated in FIG. 2.

In the arrangement shown, agreement between the search word and a stored word is shown by null detection in the corresponding word detector circuit. All other word detectors will be illuminated from at least one bit location.

In the interest of simplicity, various schemes for using dielectric coatings, total reflection mirrors and optical wave matching networks for enhancing the magneto-optical effect, and which belong in the prior art, have been omitted from the drawing and the discussion. This omission is not intended to imply that such arrangements would not be useful for the practice of the present invention.

In the present application, the term electro-optical cell is not to be limited to the devices which operate in response to the polarity and amplitude of an applied voltage to effect a rotation in the polarization of the interrogating beam because the required rotation may be obtained also by magnetic means.

Figure 3:
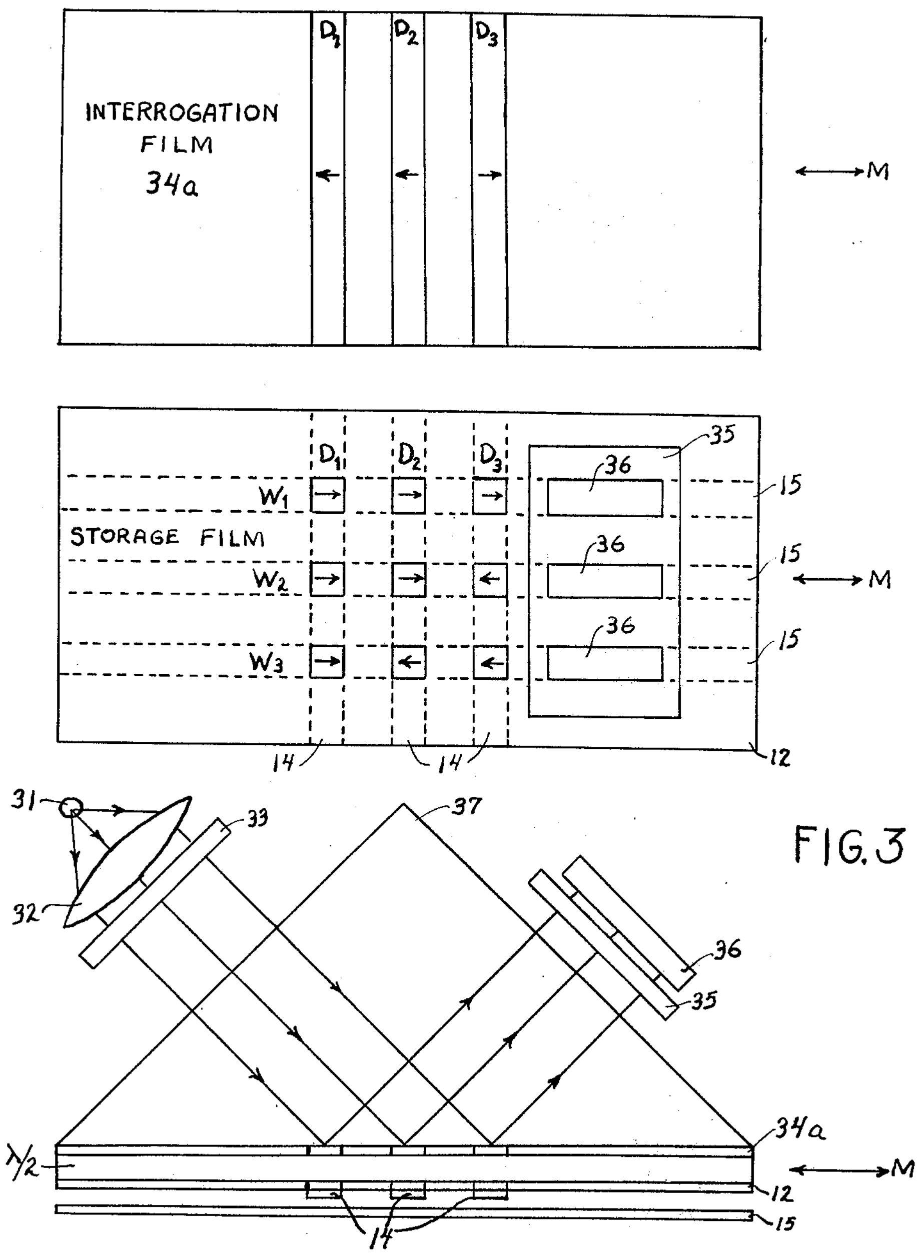
FIGURE 3 shows a second embodiment of the invention using a magnetic film to effect rotation of the interrogating beam polarization.

FIGURE 3 illustrates an alternative arrangement using the magneto-optical properties of a thin film of magnetic material to effect a rotation of $\pm\alpha$ in the plane of polarization of the interrogating light beam. As in FIG. 1, light from source 31 is formed into a collimated beam by lens 32 and polarized into a plane polarized beam by polarizer 33 before reaching prism 37 which may be flint glass. The beam of light is then totally reflected and passed through analyzer 35 to word detectors 36.

On the lower surface of prism 37 is deposited a very thin film 34*a* of magnetic material which serves as the interrogation film. Next, there is a half wave dielectric film $\lambda/2$, where $\lambda$ is the monochromatic wavelength of the interrogating beam emitted by source 31. Magnesium fluoride is an example of a suitable dielectric material. Then there is the data storage film 12, also a very thin film of magnetic material. An orthogonal array of word excitation lines 15 and digit excitation lines 14 provide for storing the bits of a word at the intersections of word and digit lines as in FIG. 1.

It is required that the magnetic material of interrogation film 34*a* shall have a coercive force $H_{ci}$ less than the coercive force $H_{cs}$ of storage film 12 and the dielectric film $\lambda/2$ is required in order to make interrogation film 34*a* and storage film 12 optically congruent. Cobalt-nickel alloys are suitable for the storage film 12 and permalloy is sugged for the interrogation film 34*a*.

The writing of information for storage is accomplished in the same manner as for FIG. 1 by the time coincidence of a transverse field from current in a word line and the digit fields from current in the digit lines. The magnitude of word and digit line currents is controlled at an amplitude which provides a total field strength exceeding the coercive force of the storage film. At the conclusion of the write operation, the stored information has been placed in both the interrogation film and the storage film, the direction of remanent magnetization being in accordance with the sense of the stored word bits. For purposes of illustration, in FIG. 3, word $W_1$ is illustrated as storing 1–1–1, word $W_2$ is storing 1–1–0, and word $W_3$ is storing 1–0–0.

The operation interrogation-write is performed by energizing the digit lines in accordance with the sense of the bits of the interrogation word and simultaneously energizing all of the word lines. In the interrogation-write operation, the magnitude of word and digit line currents must be controlled to provide a total field strength which lies below the coercive force of the storage film 12 and above the coercive force of the interrogation film 34*a*. At the end of the interrogation-write operation, the magnetic state of all of the data storage intersections of the storage film returns to the magnetic state corresponding to the bits of the stored information because the impressed field during the interrogate-write operation is below the coercive force required to change the remanent flux direction. However, the bit pattern of the interrogate word is now imposed on the interrogate film.

Since the effects of the half wave dielectric film $\lambda/2$ is to make the interrogation film 34*a* and the storage film 12 optically congruent, it follows that the magneto-optical effects add algebraically and the reflected wave from each area of bit storage will have a rotation of polarization of either $+2\alpha$, $-2\alpha$ or zero.

Light, which is reflected from the memory surface with no rotation of polarization plane, is filtered out by analyzer sheet 35 and screened from reaching the word detectors 36. Accordingly, null detection occurs in the word detector for which the bits of the word in the storage film 12 are the complement of the bit pattern in the interrogation film.

Since the fields imposed during the interrogation-write cycle are below the coercive force of the storage film, the information pattern imposed on the interrogation film can be changed repeatedly without changing the information in the memory storage film.

Since all of the multilayer devices referred to above are monochromatic and sensitive to the angle of incidence of the light beam, laser devices inherently offer the best source of light power. Since the detector must have as many channels as there are words in the memory, the use of photo-multiplier tubes is not attractive for large arrays. This suggests the use of integrated photo-sensitive semiconductor devices for detection.

Based on the foregoing disclosure, what is claimed is:

1. An optically interrogated content-addressed memory system having thin film magnetic storage elements organized by word rows and digit columns in an orthogonal array and in which information is stored as a pattern of remanent flux by a conventional electrical coincident current writing operation, wherein the improvement comprises, a collimated beam of plane polarized light illuminating said memory array and incident at an angle along the direction of said remanent flux, an electro-optical cell for each digit column interposed in the portion of the beam illuminating said column, means to energize said electro-optical cells, each with the proper polarity to effect a rotation of polarity of said beam portions to provide a pattern of polarization rotation for said digit columns corresponding to the sense of a predetermined interrogation bit pattern, a light detector for each word row disposed to be responsive to the light reflected from every digit storage location in said row, and a polarizing element located between said array and said light detectors and arranged with its transmission plane at right angles to the plane of polarization of said collimated beam to screen from said light detectors all light reflected from said array without rotation of polarization, whereby the location of a stored word digit pattern in said array corresponding to the complement of said interrogation bit pattern is recognized by null detection.

2. The optically interrogated content-addressed memory system defined in claim 1, wherein said electro-optical cell is responsive to the polarity and amplitude of an applied voltage to effect a rotation of the plane of polarization of said collimated beam of polarized light.

3. The optically interrogated content-addressed memory system defined in claim 1 wherein said electro-optical cell is a thin film of magnetic material in which the interrogation bit pattern is stored as a pattern of remanent flux and rotation of polarization is a magneto-optical effect.

4. The optically interrogated content-addressed memory system defined in claim 3 wherein said thin film of magnetic material used for interrogation is spaced from the thin film magnetic information storage array by a half-wave film of dielectric material to make said magnetic films optically congruent and wherein said beam of light is monochromatic.

5. The optically interrogated content-addressed memory system defined in claim 4 wherein the coercive force of said interrogation magnetic film is less than the coercive force of said storage magnetic film in order to use the electrical operation employed to store information for presenting the interrogation bit pattern at a reduced current amplitude.

References Cited

UNITED STATES PATENTS

| | | | |
|---|---|---|---|
| 2,984,825 | 5/1961 | Fuller et al. | 340—174 |
| 3,142,720 | 7/1964 | Adams | 88—61 |
| 3,196,206 | 7/1965 | Griffiths | 178—6.6 |

BERNARD KONICK, Primary Examiner

K. E. KROSIN, Assistant Examiner

U.S. Cl. X.R.

350—151